Figure 1A:
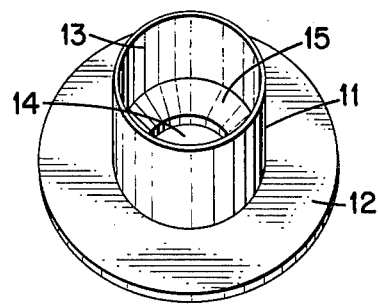

United States Patent [19]

Woodley

[11] 4,056,878

[45] Nov. 8, 1977

[54] METHOD OF FIXING A SANDWICH PANEL TO A SUPPORT

[75] Inventor: George Edward Woodley, Great Abington, England

[73] Assignee: Ciba-Geigy AG, Basel, Switzerland

[21] Appl. No.: 755,607

[22] Filed: Dec. 29, 1976

[30] Foreign Application Priority Data

Sept. 17, 1974 United Kingdom ............... 40372/74

Related U.S. Application Data

[63] Continuation of Ser. No. 611,730, Sept. 9, 1975, abandoned.

[51] Int. Cl.² ............................................. B23P 19/00
[52] U.S. Cl. .................................. 29/526 R; 52/617; 151/41.7; 156/91
[58] Field of Search .................... 29/526, 455 LM; 228/140; 156/91; 52/617, 479, 483, 495; 151/41.7

[56] References Cited

U.S. PATENT DOCUMENTS

| 2,585,557 | 2/1952 | Kreimendahl | 29/526 UX |
| 2,957,196 | 10/1960 | Kreider et al. | 29/526 UX |
| 2,961,760 | 11/1960 | Horton et al. | 29/455 LM |
| 3,008,552 | 11/1961 | Cushman et al. | 29/526 X |
| 3,041,912 | 7/1962 | Kreider et al. | 29/526 UX |
| 3,197,854 | 8/1965 | Rohe et al. | 29/526 X |
| 3,252,493 | 5/1966 | Smith | 151/41.7 |
| 3,434,262 | 3/1969 | Lawrence | 29/526 X |
| 3,526,072 | 9/1970 | Campbell | 52/617 |
| 3,892,099 | 7/1975 | Worgan et al. | 62/617 X |

FOREIGN PATENT DOCUMENTS

16,966 of 1897 United Kingdom ............... 52/483

Primary Examiner—Charlie T. Moon
Attorney, Agent, or Firm—Wenderoth, Lind & Ponack

[57] ABSTRACT

Sandwich panels, especially load-bearing panels such as aircraft floors, are fixed to support members by means of ferrules having an aperture sufficient to allow the passage of the shank, but not the head, of a bolt, by a method in which
the ferrule is inserted into a hole extending the thickness of the panel so that the body of the ferrule lies within the sandwich panel and the flange contacts a skin of the panel,
the flange is bonded to the skin which it contacts, usually by means of a thermosetting or thermoplastic adhesive,
the panel is placed against the support member in the desired location with the face of the panel carrying the flange of the ferrule in contact with the support member, and
the bolt is passed through the ferrule and screwed to the support member.

This method allows shorter bolts to be used than was previously possible, resulting in a saving in weight.

7 Claims, 4 Drawing Figures

METHOD OF FIXING A SANDWICH PANEL TO A SUPPORT

This is a continuation of application Ser. No. 611,730, filed Sept. 9, 1975 now abandoned.

This invention relates to a method of fixing sandwich panels in a desired location.

When sandwich panels are used under load-bearing conditions (such as in the structures of aircraft), strong points, or attachment points, are provided by which structural loads are transmitted from the panel to the supporting structure and vice-versa. Typically, the floor of an aircraft fuselage is rigidly attached to the aircraft structure to transmit loads from the floor to the airframe.

Hitherto, sandwich panels have been provided with hollow ferrules to reinforce holes drilled through the panels, and these ferrules form attachment points through which bolts or rivets pass. The ferrules often consist of two parts, each part having an outer flange which is bonded to the outer skin of the sandwich panel. Other ferrules have been proposed which consist of three parts, two parts having flanges which are bonded to the outer skins and the third part comprising the central body of the ferrule holding the other two parts together. These ferrules suffer from disadvantages on two counts — first, they require fitting together from both sides of the panel, which is a time-consuming process, and, secondly, they increase the total weight of the object to which they are attached, not only through their own intrinsic weight but also because the bolt used for attachment must be of sufficient length to pass from the upper surface of the panel, through its thickness and out through the underside of the panel, and still provide sufficient length of screw thread for secure fixing. We have now found that, surprisingly, a secure fixing may be obtained when the ferrule is attached to only one skin of the sandwich panel, and we have discovered a method by which sandwich panels may be fixed in a desired location using hollow ferrules which are inserted from only one side of the panel, which are lighter than conventional ferrules, and which are firmly attached with a shorter bolt than was previously possible. An added advantage of the method of the present invention is that it provides fixings which do not protrude from the face of the panel. Furnishings such as carpets coming into contact with these fixings are not therefore abraided through this contact.

Accordingly, the present invention provides a method of fixing a sandwich panel to a support member by means of a ferrule which consists of a cylindrical body portion having a flange at one end, said ferrule having an aperture sufficient to allow the passage of the shank, but not the head, of a bolt, which method comprises:

- inserting the ferrule into a hole extending the thickness of the panel such that the body of the ferrule lies within the sandwich panel and the flange contacts a skin of the panel,
- bonding the flange to the skin which it contacts,
- placing the panel against the support member in the desired location with the face of the panel carrying the flange of the ferrule in contact with the said support member, and
- passing the bolt through the ferrule and screwing it to the support member.

The ferrule is preferably of metal, especially an aluminium alloy. If desired, the hole through which the ferrule was passed may be sealed to prevent ingress of moisture into the core of the sandwich structure. Suitable sealants include preformed plugs of natural or synthetic rubber, and conventional caulking agents.

By the term 'sandwich panel' as used in this specification and the claims thereto is meant a panel having an outer facing skin on either side and a core sandwiched between the skins. The skins may be of metal or of fibre-reinforced resin, particularly a glass fibre- or carbon fibre-reinforced resin. The core is usually, though not necessarily, a honeycomb, such as of metal, fibre-reinforced resin, or resin-impregnated cellulosic or synthetic paper. It may alternatively be wood, especially end grain balsa, or a foamed plastics material.

The adhesive used to bond the ferrule to the sandwich panel may be thermosetting a thermoplastic. Suitable thermosetting materials include epoxide resins (i.e., substances containing more than one 1,2-epoxide group per molecule) and phenol-aldehyde resins with their associated curing agents. Suitable thermoplastic materials include phenoxy resins, polysulphone resins, synthetic linear polyamides of the nylon type, vinyl polymers, polyurethanes, and natural or synthetic rubbers. If desired, a mixture of adhesives may be used for example, a mixture of a thermosetting and a thermoplastic resin.

Figure 1B:
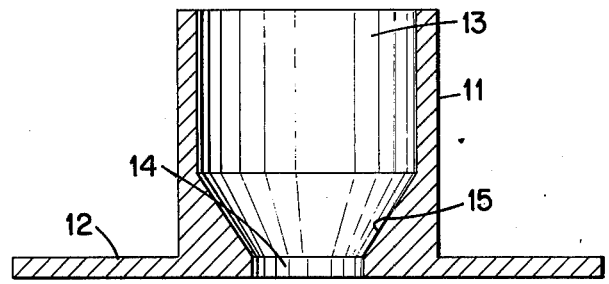
Figure 2A:
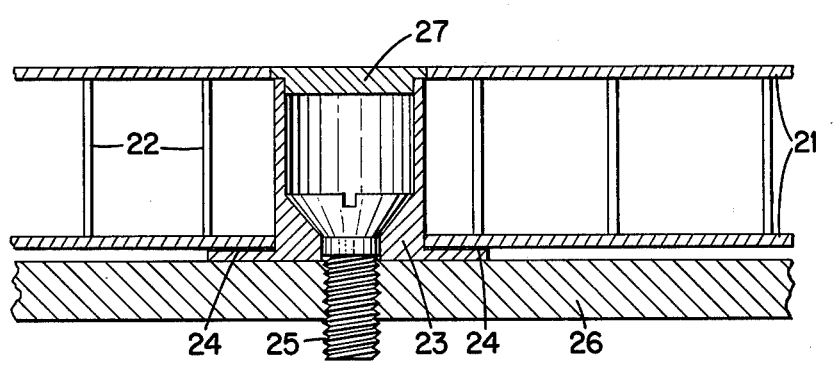
Figure 2B:
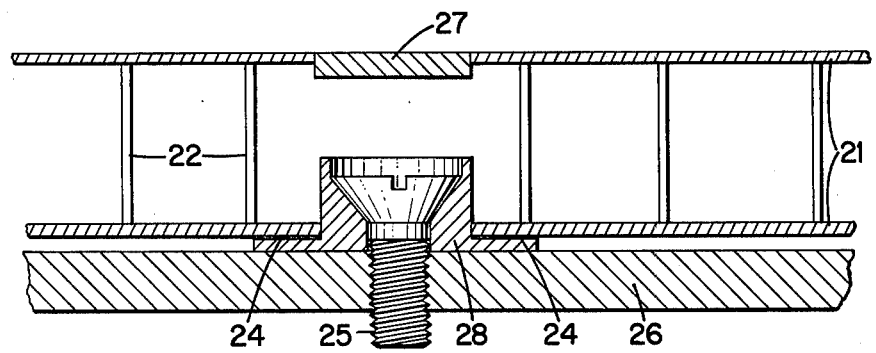

The invention will now be illustrated by reference to the following Example and the accompanying drawings in which FIG. 1A shows a perspective view of a hollow ferrule suitable for use in accordance with the method of the present invention, FIG. 1B shows a cross-section of the same ferrule, and FIGS. 2A and 2B show cross sections of sandwich panels fitted to a support in accordance with the present invention.

In FIGS. 1A and 1B the ferrule comprises a hollow body portion 11 and a flange 12, the hollow body 11 having an upper aperture 13 wide enough to take a bolt head and a lower aperture 14 wide enough to receive the shank of the bolt but too narrow to allow the bolt head to pass through. A shoulder 15 around the lower aperture 14 is bevelled at the same angle as the bolt head to ensure a close fit between the two.

In FIG. 2A, the skins 21 and core 22 of a sandwich panel are drilled to allow insertion of a ferrule 23 as described above. The ferrule is bonded in position by a layer of adhesive 24. A bolt 25 is screwed through the ferrule into a support member 26 and a plug 27 is fitted flush with the top skin of the panel to prevent ingress of moisture to the sandwich core. In FIG. 2B the ferrule 28 does not extend the full thickness of the sandwich core.

EXAMPLE

A sandwich panel 508 mm × 508 mm × 10 mm, comprising two skins of resin-impregnated unidirectional glass fibre and a core of resin-impregnated nylon paper honeycomb having a cell size of 3 mm, was fitted with 24 ferrules, as shown in FIGS. 1A and 1B, evenly spaced around the periphery of the panel. The external diameter of the body of each ferrule was 11 mm and its length was 10.6 mm; the diameter of the flange was 22.1 mm. The ferrules were bonded in position using an epoxide resin adhesive, and curing was effected at 25° C for 48 hours.

The panel was then bolted through all the ferrules to a standard panel shear frame. This frame comprised four pivoted sides, each side of the panel being bolted to one side of the frame. A shearing force was applied to the panel by pulling a pair of diagonal corners on an Amsler hydraulic tensile testing machine. The shear strength of the panel, tested in this way, was 35.9 kN. When an identical panel was fitted with conventional two-part ferrules and treated in the same manner, the strength was 41.8 kN. The strength required, according to an aircraft manufacturer's specification, is 33.9 kN.

It may be seen therefore that, although the panel fixed in accordance with the present invention was weaker than one fixed conventionally, it was stronger than the minimum required.

I claim:

1. A method of fixing a sandwich panel having two spaced opposed skins and a core joining said skins to a support member, comprising:

inserting into a hole in one skin of said panel a cylindrical body portion of a ferrule having a hollow cylindrical body portion with an exterior flange on one end thereof and a seat within said cylindrical body portion at the same end as said exterior flange and said seat having an aperture therein of a size sufficient to pass the shank of a fastening element having a shank with a head thereon, the inserting of said ferrule being continued until said flange is against the outside of said one skin;

bonding said flange to the outside of said one skin;

placing the sandwich panel against the support member in the desired position with the skin of the panel having the flange of the ferrule bonded thereto against the support member; and passing the shank of a headed fastening element having a shank with a head thereon through said aperture in said seat from inside said cylindrical body portion and into said support member until said head is against said seat and securing said shank to said support member;

whereby there can be used a fastening element which has a shank which is only long enough to extend through said seat and to the desired depth into said support member.

2. A method as claimed in claim 1 in which the step of passing the shank through the aperture in said seat from inside the cylindrical body portion comprises passing the fastening element shank first into the cylindrical body portion through a hole in the other skin of said panel member which is aligned with said cylindrical body portion, and subsequently plugging said hole in the other skin.

3. The method of claim 1 in which the ferrule is of metal.

4. The method of claim 3 in which the ferrule is of aluminum alloy.

5. The method of claim 1 in which the flange of the ferrule is bonded to the skin of the sandwich panel by means of a thermosetting adhesive.

6. The method of claim 1, in which the flange of the ferrule is bonded to the skin of the sandwich panel by means of a thermoplastic adhesive.

7. The method of claim 1, in which the sandwich panel is an aircraft floor panel and the support is an airframe member.

* * * * *